US005736740A

United States Patent [19]

Franzen

[11] Patent Number: 5,736,740

[45] Date of Patent: Apr. 7, 1998

[54] METHOD AND DEVICE FOR TRANSPORT OF IONS IN GAS THROUGH A CAPILLARY

[75] Inventor: Jochen Franzen, Bremen, Germany

[73] Assignee: Bruker-Franzen Analytik GmbH, Bremen, Germany

[21] Appl. No.: 622,893

[22] Filed: Mar. 29, 1996

[30] Foreign Application Priority Data

Apr. 25, 1995 [DE] Germany ........................ 195 15 271.9

[51] Int. Cl.$^6$ ............................ B01D 59/44; H01J 49/00

[52] U.S. Cl. ............................................ 250/288; 250/282

[58] Field of Search .................................... 250/281, 282, 250/288, 423 R

[56] References Cited

U.S. PATENT DOCUMENTS

| | | | |
|---|---|---|---|
| Re. 35,413 | 12/1996 | Mylchreest et al. | 250/282 |
| 4,362,936 | 12/1982 | Hofmann | 250/292 |
| 4,542,293 | 9/1985 | Fenn et al. | 250/288 |
| 4,705,616 | 11/1987 | Andresen et al. | 250/288 |
| 5,060,482 | 10/1991 | Jackson | 62/51.3 |
| 5,122,670 | 6/1992 | Mylchreest et al. | 250/423 R |
| 5,157,260 | 10/1992 | Mylchreest et al. | 250/288 |
| 5,543,618 | 8/1996 | D'Silva | 250/288 |

FOREIGN PATENT DOCUMENTS

| | | |
|---|---|---|
| A2256525 | 12/1992 | United Kingdom . |
| WO9324952 | 12/1993 | WIPO . |

OTHER PUBLICATIONS

Baiwei Lin et al. *Ion Transport by Viscous Gas Flow through Capillaries*, American Society for Mass Spectrometry, vol. 5, pp. 873–885, Jun. 7, 1994.

C.M. Whitehouse et al., *Electrospray Interface for Liquid Chromatographs and Mass Spectrometers*, American Chemical Society, vol. 57, No. 3, pp. 675–679, Mar. 1985.

*Primary Examiner*—Bruce Anderson

[57] ABSTRACT

The invention relates to methods and devices for transporting ions in a laminar gas flow through a tube, preferably through a capillary tube. During the transport, the ions must not touch the wall of the capillary or else they will be discharged upon collision with the wall. The invention consists of keeping the ions in the gas flow free of any wall collisions by gas-dynamic focussing of the ions into the center of the gas stream. Focussing is achieved when the ions are decelerated by an electric field relative to the gas flow so that they have a lower transport velocity than the gas stream. Due to the parabolic velocity profile of the laminar gas stream, ions which are not at the center of the capillary are subjected to circumference by gas with different velocities at both sides, resulting in a force toward the capillary axis. This component of force is the stronger the farther the ions are away from the center axis and the more they are decelerated.

10 Claims, 2 Drawing Sheets

METHOD AND DEVICE FOR TRANSPORT OF IONS IN GAS THROUGH A CAPILLARY

The invention relates to methods and devices for transporting ions, against an electric potential difference, in a laminar gas flow through a capillary tube from atmospheric pressure into the vacuum system of a mass spectrometer.

The invention consists of using capillaries with an electrically weakly conducting inner surface, either by a coating or by electrically conducting capillary material. The invention avoids any charging-up of the inner surface, stopping the ions from transport. Furthermore, the invention allows to heat the capillary along its length, and helps to focus the ions towards the axis by two different mechanisms.

PRIOR ART

In vacuum, there are various devices for the transport of ions from one location to another, the optimum choice of which depends on the predominant pressure conditions. Satisfactory solutions exist for the transport of ions in a ultra-high, high, and roughing vacuum but there are as yet none for loss-free transport of ions through tubes at ambient air conditions or with other gases at normal pressures. Particularly for the transport of ions from ambient air into the vacuum of a mass spectrometer there is not yet a sufficiently loss-free transport option available.

In air or in other gases ions can survive for any length of time if the energy for their ionization is larger than the energy required to ionize the ambient gases and if ions of different polarity or electrons are not available for recombinations. The transport of ions through gases can be caused by electric fields, whereby the motion is determined by the laws of ion mobility.

In addition, transport of ions can also be accomplished by the moving gas itself. If gas is forced through a capillary, ions are carded along by gas viscosity. It is well-known that ions which are generated outside the vacuum system can be guided into the vacuum of a mass spectrometer through such a capillary. However, when transporting ions through capillaries the ions must be prevented from colliding with the wall because such wall collisions generally discharge the ions and thus destroy them.

From capillary chromatography it is known that the molecules of a gas which moves through a capillary suffer a high number of wall collisions. The number of wall collisions is basically the same as the number of theoretical (evaporation) plates, which stand for the separating capacity of chromatographic columns. It is exceptionally high in capillary columns. As a rule of thumb it may be stated that, statistically, after covering a distance equal to the diameter of the capillary, a molecule hits the wall once. However, the collisions appear statistically; for a given ion, there are long distances without any wall collisions, intersected by periods with extremely frequent wall collisions.

In the paper entitled "Ion Transport by Viscous Gas Flow through Capillaries" by B. Lin and J. Sunner in J. Amer. Soc. Mass Spectr. 5, 873 (1994) the phenomenon of the transport of ions in capillaries was investigated. First of all the authors refuted the widespread notion that ions can be focussed by charging the capillary walls. Within a capillary with evenly charged walls there is a field-free space in which the ions cannot be focussed in any way whatsoever. Them is no repulsion of the ions when they approach the charged wall. The result of the authors' experiments was that substantial losses do occur due to the diffusion of the ions to the walls in a theoretically expectable magnitude and that only a statistically expectable remainder of ions can pass through the capillary without any damage. The yield of transported ions is inversely proportional to the length of the capillary and is also drastically reduced for thinner capillaries. A further loss occurs due to space charge effects.

It is also known that one can even pump the ions against a potential difference through viscous transport of the ions in the gas stream, as described in U.S. Pat. No. 4,542,293. This is already utilized in commercially available devices. The ions can thus be pumped to an acceleration potential within a mass spectrometer. In another example, the needle of an electrospray ion source outside the vacuum can be connected to ground potential for safety reasons and the entrance of the capillary can be connected to the spray potential.

DISADVANTAGES OF THE PRIOR ART

Using an insulating capillary for the transport of ions into a mass spectrometer against a potential difference has the drawback that periodicly the capillary stops transporting the ions while the gas still flows through. Storing the capillary for several days in air restores the ion transport capabilities. The stop is presumably caused by irregular wall-charging.

Furthermore, the capillaries should be heated to prevent any condensation of substances at the inner walls of the capillary. Especially in the case of electrospray ionization, small droplets of water or other spray liquids penetrate into the capillary. These droplets should be evaporated, otherwise they freeze inside the capillary and cause damage to the spectrometric procedures.

Heating is a problem for the generation of an electrical potential difference along the capillary. The electric field generated by the potential difference must be exactly aligned in the direction of the axis of the capillary, otherwise the ions are deflected towards the walls and discharged. Any electrical heating system along the capillary disturbs this field.

At present, the amount of gas fed into the vacuum system of a mass spectrometer generally makes it necessary to use a differential pumping system with three or even four pressure stages. Commercially available electrospray ion sources are delivered with these pressure stages, with the drawbacks of high costs and moderate ion yield. In the first differential pumping stage, there is a relatively high pressure which considerably impedes further passage of the ions. The ions are accelerated, by the gas stream, toward skimmers which are located opposite the end of the capillaries. In the process of this, ion losses occur by scattering and by the expansion of the gas into a considerably large space angle. It is not possible to use high voltages for the guidance of ions because under such pressure conditions electrical gas discharges occur very easily, and the accelerated ions suffer from fragmentation. Only in the second pressure stage is it possible to trap the ions efficiently, for example, by an ion guide system comprising a multipole arrangement of long pole rods.

OBJECTIVE OF THE INVENTION

It is the objective of the invention to find a method and a device with which icons can be transported in the laminar flow of a gas through a capillary against a potential difference without the danger of stopping the ion beam by wall charging. Furthermore, the problem of heating the capillary should be solved. Losses of ions by discharging at the walls should be minimized, if possible, so that capillaries with smaller inner diameters than hitherto can be effectively used.

BRIEF DESCRIPTION OF THE INVENTION

It is the idea of the invention to use a capillary the inner wall of which is conductive with a high resistence. The conductivity may be produced by an evenly distributed wall coating, or by use of an conducting capillary material of high resistence. The potential drop of a current along the resistence creates a very nicely aligned electric field along the axis of the capillary. The resistence can be chosen such that the electric current heats the capillary evenly. There is no charging-up of the walls because the ion current which may possibly charge-up the walls, is smaller by many orders of magnitude than the electric current along the capillary. The maximum transportable ion current is in the order of about $10^{-10}$ A, and the heating current is in the order of $10^{-4}$ to $10^{-3}$ A, depending on the voltage difference along the capillary.

FURTHER ADVANTAGES OF THE INVENTION

In addition to a gasdynamic focusing of the ions, occurring when ions are pumped against a potential difference, there will be a thermodynamic focusing if the capillary is heated. Both focusing effects help to avoid ion losses.

Gas-dynamic focusing: In the capillary, the ions move, relative to the flowing gas, in the reverse direction by the electric field. Thus they have a slower transport velocity than the velocity of the gas in the axis of the tube. The relative velocity of the ions compared with the flow of gas, is determined by the laws of ion mobility under the influence of an electric field. Due to the velocity difference, there is a laminar flow of gas around each of the ions.

This laminar flow of the gas through the capillary has a parabolic velocity profile. The gas assumes its maximum velocity along the axis of the capillary; the velocity declines toward the wall of the capillary. Near the wall the velocity is practically zero. The velocity along the axis is just double the average velocity.

If an ion is not just flowing in the axis of the capillary, it has a slightly lower velocity of gas circumference on the side near to the wall than on the side toward the center axis. According to the laws of Bernoulli, a slight velocity difference of the gas circumference becomes apparent in so-called circumference elevation, which is directed toward the side of the higher gas velocity, i.e. toward the axis. (The circumference elevation of an aircraft wing is known, even though the different gas velocities below and above the wing are created in a slightly different manner by the curvature of the wing, and keeps the aircraft in the air.) This gas-dynamic focussing force counteracts the incidental motion of an ion by diffusion toward the wall and returns the ion to the axis of the capillary. The focussing force is proportional to the difference between the squares of the circumference velocity on both sides of the ion so it increases as deceleration increases. There is no such force if the ion moves at the same velocity as the ambient gas.

This gas-dynamic focusing is much improved by the constant and well-aligned field created by this invention.

Thermodynamic focusing: This focusing effect affects only ions which are larger than the gas molecules. Near the inner wall of the capillary, gas molecules flying towards the axis after a wall collision, have a higher average velocity than the molecules flying from the cooler gas towards the wall. A bigger particle approaching the wall thus encounters collisions by faster particles on the wall side, and sees slower particles on the side towards the axis. This results in a focusing force on the ion in the direction of the capillary axis (in the United States, this effect is known by the name "inverse thermofreeze effect").

Both focusing effects prevail as long as no space charge field of sufficient strength is built up on the axis of the capillary due to very high ion densities. Space charge would prevent gasdynamic or thermodynamic focusing by Coulomb repulsion. From our experience, space charges in the magnitude of at least 100 ions per millimeter of the capillary can be overcome by the focusing effects without suffering major losses of ions. Consequently, about 1,000,000 ions can be transported per second in a flow having an axial velocity of only 10 meters per second, which is sufficient to fill an ion trap mass spectrometer at least 10 times per second. At a velocity of 100 meters per second an ion current of 1 picoamp can be transported without any losses.

The focusing effects for ions resulting from this invention have so far not been described in the literature. There is some surprise to the expert that in a normal 30 centimeter long thin fused silica capillary with a standard inside diameter of 200 micrometers, if a voltage of five kilovolts is applied to a resistance layer at the inner wall of the capillary and the capillary is heated up to about 200° C., an ion current of roughly one picoamp can be transferred from the ambient air to the vacuum of a mass spectrometer with virtually no losses, even if the capillary is bent. The axial velocity of air flow in the axis of this capillary amounts to 13 meters per second (at an air temperature of 150° C. in the capillary). An ion of 50 atomic mass units acquires a velocity of about 6 meters per second relative to the gas so it is only transported in forward direction near the axis. An ion of 1,000 atomic mass units is only decelerated by about 0.8 meters per second relative to the gas velocity so in this case transport is much easier. There exists a lower cut-off mass of 20 atomic mass units below which no ion transport is possible at all because the decelerating velocity is larger then the maximum gas velocity in forward direction.

As mentioned above, the gas-dynamic focusing force depends on the difference between the squares of the velocity on both sides of the ion. A field with strong deceleration therefore creates greater focusing forces but on account of a higher ion density in the gas stream of the capillary tube, thus creating greater space charge.

Assuming the same length and same pressure conditions, the volumetric flow inside a capillary is proportional to the fourth power of inside diameter so the velocity of flow is proportional to the square of inside diameter. Because, however, the ion current is essentially limited by the space charge, the transportable ion current should not decrease by these factors. Thus the capillary can be ideally selected according to requirements.

If ionization provides a high ion density within a small volume of gas, as for example chemical ionization at atmospheric pressure (APCI), or the so-called microelectrospray, a fine capillary with an inside diameter of approximately 200 micrometers can be used. If, on the other hand, the ionization process provides a low ion density, as for example the classic electrospray method (ESI) or ionization by inductively coupled plasma (ICP), the larger capillary with an inside diameter of approx. 500 micrometers is more appropriate.

If there is a low gas flow, the ions emerging from the capillary can be immediately taken up by an ion guide or ion store system in the form of an RF multipole rod system because in the vacuum chamber at the end of the capillary an adequately low pressure can be maintained by moderately small high vacuum pumps.

A BRIEF DESCRIPTION OF THE DRAWINGS

DETAILED DESCRIPTION OF THE PREFERRED EMBODIMENTS

Figure 1:
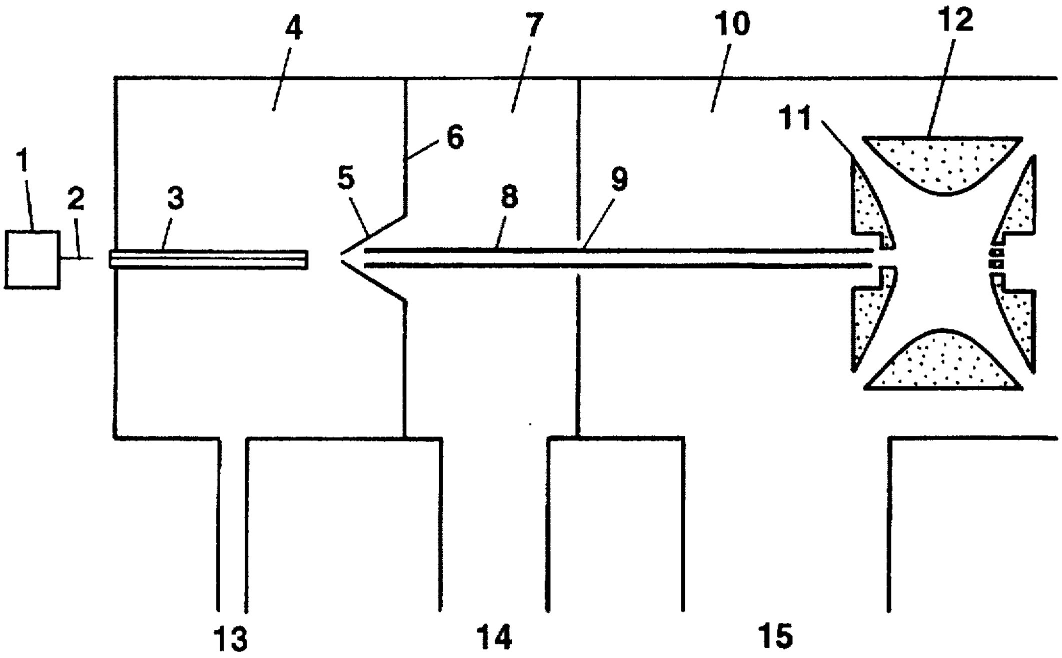
FIG. 1 is a schematic view of an ion trap mass spectrometer with an electrospray ion source according to the present invention.

FIG. 1 shows an arrangement comprising a normal external electrospray ion source (1, 2) and an ion trap mass spectrometer, with a large introduction capillary (3) having a length of 15 centimeters and an inside diameter of 0.5 millimeters. The capillary (3) has an internal resistance layer according to this invention (not visible here) which is subjected to a voltage of 5 kilovolts and produces a field of approx. 330 volts per centimeter along the capillary.

The supply tank (1) contains a liquid which is sprayed by an electric voltage between the spray capillary (2) and the end of the introduction capillary (3). The ions enter the differential first pump chamber (4) through the introduction capillary (3) together with ambient air, whereby due to the electric field along the capillary the ions are focussed gas-dynamically by virtue of this invention. The first pump chamber (4) is connected to a prevacuum pump via the pipe (13). The ions are accelerated toward the skimmer (5) as efficiently as possible and they pass through the aperture in the skimmer (5), which is located in the partition (6), into the second chamber (7) of the differential pumping system. This chamber (7) is connected to a high vacuum pump via pump pipe (14). The ions are accepted by the ion guide (8) and guided through the wall opening (9) and the main vacuum chamber (10) to the end cap (11) of the ion trap. The ion trap consists of two end caps and the ring electrode (12). The main vacuum chamber is connected to a high vacuum pump via pump pipe (15).

Figure 2:
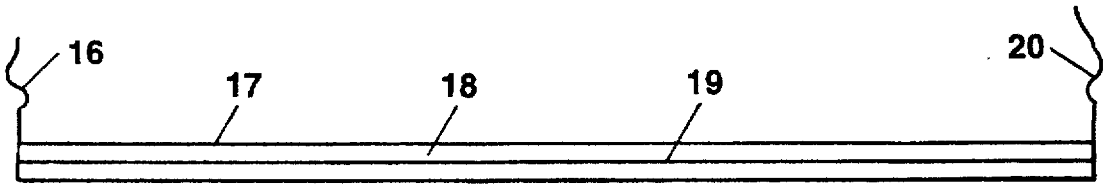
FIG. 2 is a schematic view of an inlet capillary usable with the ion source shown in FIG. 1.

FIG. 2 shows a detailed view of an inlet capillary (3) from FIG. 1. The capillary has rather thick walls—for mechanical stability—and is made from a highly resistive material (18). The resistive capillary is supplied at both ends with a voltage difference via voltage supply leads (16) and (20). The capillary with its channel (18) has to be tightly fastened by gaskets into the recipient wall of the vacuum system, therefore the outside of the capillary is protected against current leakages by a high-temperature insulating lacquer (17).

Figure 3:
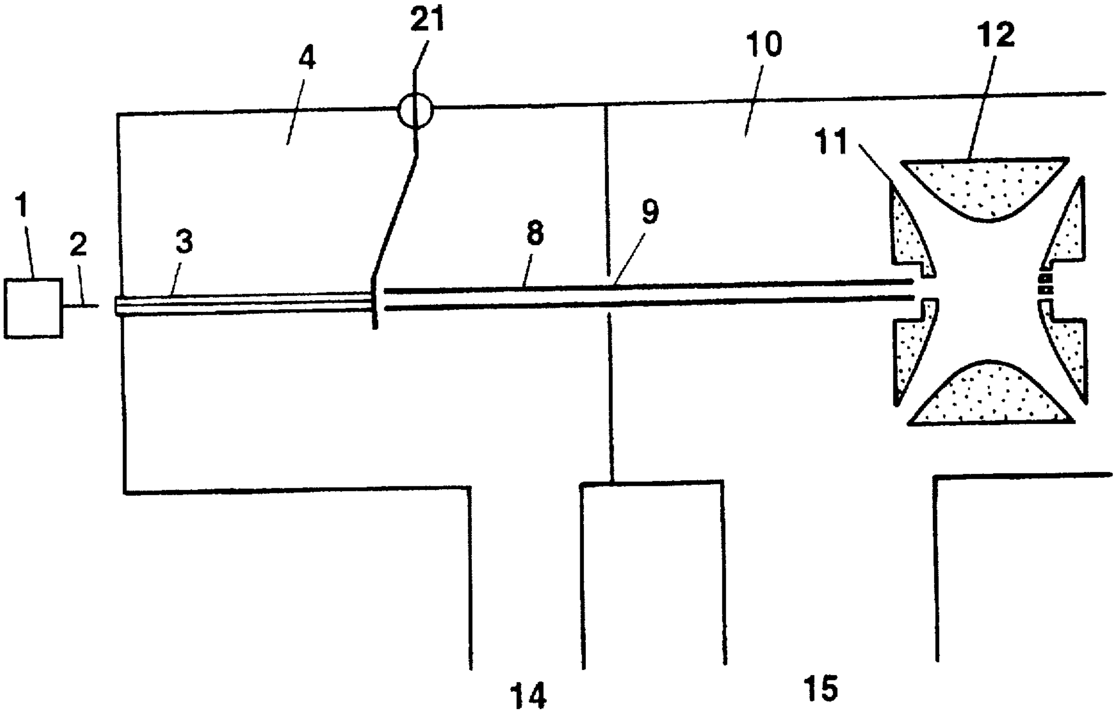
FIG. 3 is a schematic view of an ion trap mass spectrometer with an alternative embodiment of the invention that uses a micro-electrospray ion source.

FIG. 3 shows an arrangement comprising a micro-electrospray ion source (1, 2) with a fine introduction capillary (3) having a length of 25 centimeters and an inside diameter of 0.2 millimeters. The capillary (3) here also has an internal resistance layer (not visible), which in this case is provided with a lower voltage of only three kilovolts. This produces a field of approx. 110 volts per centimeter along the capillary.

The microspray unit differs from a normal electrospray unit in that it has a much finer spray capillary (2). The liquid from the supply tank (1) is here too sprayed by an electric voltage between the fine spray capillary (2) and the end of the introduction capillary (3). The ions enter the antechamber (4) through the finer and longer introduction capillary (3) together with ambient air, whereby here too the ions are focused gas-dynamically by the electric field along the capillary and thermodynamically by the heated capillary according to this invention. Here too the field is generated by a resistance layer inside the capillary (not visible in the figure). The antechamber (4) is connected to the second stage of the main vacuum pump via pipe (14). Due to the low influx a pressure of approx. $10^{-3}$ millibar is maintained in the antechamber (4). For this reason the ions can be accepted by the rf multipole rod ion guide (8) here immediately. They are then guided through the wall opening (9) and the main vacuum chamber (10) to the end cap (11) of the ion trap.

Figure 4:
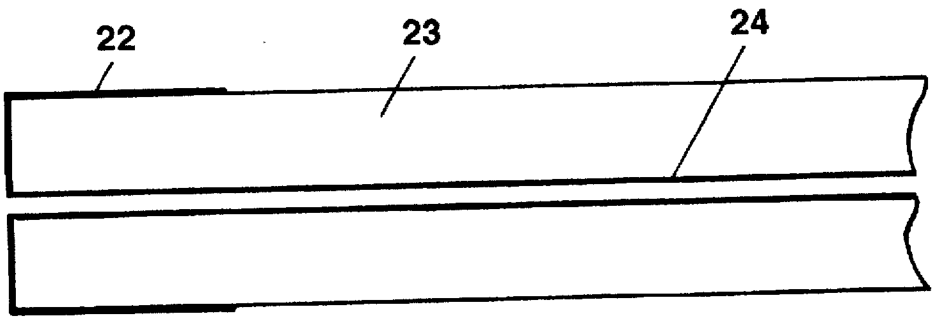
FIG. 4 is a schematic view of a capillary with a resistance layer applied to its inner wall.

FIG. 4 shows the end of a capillary with a high-resistance coating (24) on the inside of the capillary wall (23). The coating may be produced as lead oxide ($Pb_2O_3$) by a process similar to that of making channeltron multipliers. The end of the capillary and part of the outer wall is coated with a layer of gold (22) which serves to make contact with the high resistance layer (24).

PARTICULARLY FAVORABLE EMBODIMENTS

The embodiment described here first uses a thin capillary, as can be used for ionization methods with small amounts of gas produced. The arrangement is shown in FIG. 3. However, the invention should explicitly not be restricted to the types of ion generation or mass spectrometry mentioned in the following.

A capillary (3) with a length of 25 centimeters and an inside diameter of 200 micrometers, heated to 150° C., draws in about 300 cubic millimeters of air per second. This is sufficient for an APCI ion source or also for a microelectrospray ion source. The maximum gas velocity on the axis is about 15 meters per second. At the vacuum end, a pump with a speed of 100 liters per second at flange (14) is sufficient to generate a pressure of $3\times10^{-3}$ millibar in the antechamber (4). At this pressure in the antechamber (4) the ions can be immediately accepted by an RF ion guide system (8), which, for example, can take the form of a hexapole comprising six thin pole rods each having a diameter of 1 millimeter, and can guide the ions through a small hole (9) in the wall between the antechamber (4) and main vacuum chamber (10) to the mass spectrometer, which is here illustrated as an ion trap with end caps (11) and ring electrode (12). The ion trap here serves only as an example for any mass spectrometer—it can equally be an ICR spectrometer, a magnetic sector field, a quadrupole filter, or any other mass spectrometer.

Focusing of the ions inside the capillary (3) and heating the capillary can both be performed by a voltage of 3 kilovolts which is connected to both ends of a resistance layer on the inner surface of the capillary. Connection (21) supplies the voltage to the vacuum end of the capillary, the other end is connected to the wall of the vacuum chamber (4). A resistance of 3 megohms allows a current of one milliamp to flow, with an ohmic loss of approximately 3 watts. These 3 watts can, in turn, heat up the capillary to the required 150° C. Most of the heat is necessary to keep the temperature of the capillary, and only a small amount is used to heat the gas flow inside. The voltage of 3 kilovolts generates a field which decelerates the ions of a mass of 100 atomic mass units by about 3 meters per second, and ions with 1,000 atomic mass units by about 0.6 meters per second.

If one wishes to use lower voltages, one can again achieve very favorable gas-dynamic focussings by shortening the capillary and reducing the inside diameter. A voltage of 1 kilovolt across a 5 cm capillary with an inside diameter of 100 micrometers produces a gas velocity of about 20 meters per second at 100 microliters of gas flow drawn off per second, and a deceleration of 50 u ions at 7 meters per second. With a high vacuum pump drawing in 30 liters per second a pressure of $3\times10^{-3}$ millibar is generated.

A preferred form of a resistance layer is illustrated in FIG. 4. Here the resistance layer (24) is applied to the inner wall of the capillary material (23). Contact is made by a gold plating (22) at the end of the capillary, whereby the gold plating (22) covers the end of the capillary and part of the outer wall. The gold plating can be very efficiently used to supply voltage.

According to the invention, the resistance layer (24) on the inner wall of the capillary has the special advantage in that the inside wall cannot be charged by wall contacts with ions, which could otherwise lead to a distortion of the field.

It is also very favorable to use a slightly electrically conductive material such as high-resistance plastic material or a doped glass to produce the capillary.

For an ion source with a larger amount of gas being produced, for example a commercially available electrospray ion source (ESI) or an ion source with inductively coupled plasma for ion generation ICP), one can select a capillary with a larger inside diameter, as illustrated in FIG. 1. An unheated capillary (3) with a length of 15 centimeters and an inside diameter of 0.5 millimeters draws off 26 milliliters of air per second. The gas velocity on the axis is 210 meters per second. A voltage of 15 kilovolts for the deceleration field decelerates ions with 1,000 atomic mass units by 5 meters per second and ions with 50 atomic mass units by 36 meters per second. Focussing of the ions is therefore exceptionally good and permits ion currents of about 100 picoamps. With a 20 liters per second roughing pump at flange (13) a pressure of about 1 millibar can be created in the first pressure stage (4) of the differential pump unit. This pressure is unsuitable for an ion guide. For this reason a second pressure stage (7) was introduced. Opposite the capillary (3) a gas skimmer (5) is fitted in the wall (6), causing the stream of incoming air to be deflected outward. It has the task of drawing off some of the ions through a hole with a diameter of approx. 1.2 millimeters into the next chamber. To do this, a slight suction voltage is applied between the end of the capillary and the gas skimmer. However, since the ions have a broad energy distribution when they emerge from the capillary and the gas pressure amounts to 1 millibar, the scatter of the ions disturbs the ion-optic effect, and only some of the ions can be transferred to the next chamber (7). In the next chamber an ion guide (8) can be used to transport the ions further.

These examples are only some cases of special interest for mass spectromeuicians. As any expert is aware, many other cases of ion guidance can be verified.

For example, it is possible to feed the necessary reactant gas ions through a capillary to a cell for chemical ionization in the air at atmospheric pressure if the ions are focussed on the principle of the invention. Ions can also be supplied through reaction chambers of a very different nature for chemical purposes.

I claim:

1. Method for transporting ions by a laminar gas flow through a capillary against an electrical field in the direction of the capillary axis, the method comprising:

providing the capillary with a weakly conducting inner surface; and applying a voltage to the conducting surface at both ends of the capillary to generate the electric field.

2. Method as in claim 1, wherein the weakly conducting inner surface is generated by applying a conducting layer to the inner surface of the capillary.

3. Method as in claim 1, wherein the weakly conducting surface is generated by a weakly conducting capillary material.

4. Method as in claim 1, wherein the ions traveling through the capillary are transported from an ion source at atmospheric pressure into the vacuum system of a mass spectrometer.

5. Method as in claim 4, wherein field generating current through the weakly conducting surface is used to heat the capillary.

6. Apparatus for the transport of ions by a flowing gas against a potential difference from a region of higher pressure into the vacuum system of a mass spectrometer, comprising:

a capillary having a weakly conductive inner surface; and a voltage source applying a voltage potential between the two ends of the capillary.

7. Apparatus as in claim 6, wherein the weakly conductive inner surface comprises a high-resistence coating.

8. Apparatus as in claim 6, wherein the weakly conductive inner surface is generated by the use of a highly resistive capillary material.

9. Apparatus as in claim 6, wherein the capillary carries electrical contacts, at both ends, for the application of the voltage potential.

10. Apparatus as in claim 6, wherein the weak conductivity of the inner surface is chosen such that the selected voltage potential generates a current which heats the capillary to a selected temperature.

* * * * *